(12) United States Patent
Look (10) Patent No.: US 7,848,644 B2
(45) Date of Patent: Dec. 7, 2010

(54) METHOD AND AN APPARATUS TO PROVIDE OPTICAL EQUIPMENT PROTECTION

(75) Inventor: Christopher M. Look, Pleasanton, CA (US)

(73) Assignee: Dynamic Method Enterprises Limited, Hong Kong (HK)

(*) Notice: Subject to any disclaimer, the term of this patent is extended or adjusted under 35 U.S.C. 154(b) by 853 days.

(21) Appl. No.: 10/785,618

(22) Filed: Feb. 23, 2004

(65) Prior Publication Data

US 2009/0034963 A1    Feb. 5, 2009

(51) Int. Cl.
*G02F 1/00* (2006.01)
*H04B 10/00* (2006.01)
*H04B 17/00* (2006.01)

(52) U.S. Cl. .......................................... 398/10; 398/11
(58) Field of Classification Search ................ 398/1–8, 398/12, 19, 37, 59, 47
See application file for complete search history.

(56) References Cited

U.S. PATENT DOCUMENTS

| | | | |
|---|---|---|---|
| 4,451,916 A | 5/1984 | Casper et al. | |
| 4,809,361 A | 2/1989 | Okada et al. | |
| 4,845,703 A | 7/1989 | Suzuki | |
| 4,994,675 A | 2/1991 | Levin et al. | |
| 5,130,837 A * | 7/1992 | Kitamura et al. | 398/37 |
| 5,130,984 A | 7/1992 | Cisneros | |
| 5,144,297 A | 9/1992 | Ohara | |
| 5,157,654 A | 10/1992 | Cisneros | |
| 5,166,926 A | 11/1992 | Cisneros et al. | |
| 5,296,850 A | 3/1994 | King | |
| 5,319,482 A | 6/1994 | Tsuchiya et al. | |
| 5,347,384 A | 9/1994 | McReynolds et al. | |
| 5,452,115 A | 9/1995 | Tomioka | |
| 5,488,501 A | 1/1996 | Barnsley | |
| 5,495,358 A | 2/1996 | Bartig et al. | |
| 5,502,587 A | 3/1996 | Frigo | |
| 5,515,361 A | 5/1996 | Li et al. | |
| 5,521,732 A | 5/1996 | Nishio | |
| 5,535,373 A | 7/1996 | Olnowich | |
| 5,537,393 A | 7/1996 | Shioda et al. | |
| 5,539,564 A * | 7/1996 | Kumozaki et al. | 398/5 |
| 5,559,622 A * | 9/1996 | Huber et al. | 398/5 |

(Continued)

OTHER PUBLICATIONS

Rajiv Ramaswami et al., "Optical Networks, A Practical Perspective" Second Edition, Morgan Kaufmann Publishers, ISBN 1-55860-655-6, San Francisco, CA, USA. (831 pages).

(Continued)

*Primary Examiner*—Ken N Vanderpuye
*Assistant Examiner*—Danny W Leung
(74) *Attorney, Agent, or Firm*—Blakely, Sokoloff, Taylor & Zafman, LLP (57) ABSTRACT

A method and an apparatus to provide optical equipment protection have been disclosed. In one embodiment, the method includes splitting an incoming optical signal into a first and a second optical signals, sending the first and the second optical signals to a first and a second equipments in an optical network node, respectively, the second equipment being a protection module for the first equipment, monitoring a first and a second outgoing optical signals from the first and second equipments, and declaring a failure of the optical network node if only one of the first and the second outgoing optical signals has failed. Other embodiments have been claimed and described.

24 Claims, 5 Drawing Sheets

U.S. PATENT DOCUMENTS

| | | | |
|---|---|---|---|
| 5,559,624 A | 9/1996 | Darcie et al. | |
| 5,594,581 A * | 1/1997 | Alphonsus | 398/6 |
| 5,627,837 A * | 5/1997 | Gillett | 714/708 |
| 5,627,925 A | 5/1997 | Alferness et al. | |
| 5,679,987 A | 10/1997 | Ogawa | |
| 5,682,257 A | 10/1997 | Uchida | |
| 5,708,753 A | 1/1998 | Frigo et al. | |
| 5,777,761 A | 7/1998 | Fee | |
| 5,844,702 A | 12/1998 | Yarkosky et al. | |
| 5,867,289 A | 2/1999 | Gerstel et al. | |
| 5,896,212 A | 4/1999 | Sotom et al. | |
| 5,920,414 A | 7/1999 | Miyachi et al. | |
| 5,970,201 A | 10/1999 | Anthony et al. | |
| 5,978,113 A | 11/1999 | Kight | |
| 6,005,696 A | 12/1999 | Joline et al. | |
| 6,101,010 A | 8/2000 | Konishi | |
| 6,101,014 A | 8/2000 | Majima | |
| 6,128,115 A | 10/2000 | Shiragaki | |
| 6,137,927 A | 10/2000 | Keck et al. | |
| 6,215,763 B1 | 4/2001 | Doshi et al. | |
| 6,229,788 B1 | 5/2001 | Graves et al. | |
| 6,246,511 B1 | 6/2001 | Jameson | |
| 6,307,653 B1 * | 10/2001 | Bala et al. | 398/2 |
| 6,332,055 B1 | 12/2001 | Hatayama et al. | |
| 6,369,926 B1 | 4/2002 | Lyu et al. | |
| 6,417,944 B1 | 7/2002 | Lahat et al. | |
| 6,433,900 B1 * | 8/2002 | Kuroyanagi et al. | 398/19 |
| 6,466,343 B1 | 10/2002 | Lahat et al. | |
| 6,477,288 B1 * | 11/2002 | Sato | 385/16 |
| 6,504,969 B1 | 1/2003 | Tsao et al. | |
| 6,507,421 B1 | 1/2003 | Bishop et al. | |
| 6,556,319 B2 * | 4/2003 | Esman et al. | 398/5 |
| 6,574,018 B1 | 6/2003 | Handelman | |
| 6,580,531 B1 | 6/2003 | Swanson et al. | |
| 6,583,901 B1 | 6/2003 | Hung | |
| 6,587,236 B1 | 7/2003 | Butler et al. | |
| 6,590,681 B1 | 7/2003 | Egnell et al. | |
| H002075 H | 8/2003 | Gnauck et al. | |
| 6,671,469 B1 | 12/2003 | Fukagawa et al. | |
| 6,704,508 B1 | 3/2004 | Asahi | |
| 6,721,502 B1 * | 4/2004 | Al-Salameh et al. | 398/3 |
| 6,738,581 B2 | 5/2004 | Handelman | |
| 6,754,449 B2 * | 6/2004 | Chang et al. | 398/51 |
| 6,771,908 B2 * | 8/2004 | Eijk et al. | 398/66 |
| 6,775,237 B2 * | 8/2004 | Soltysiak et al. | 370/241 |
| 6,798,991 B1 | 9/2004 | Davis et al. | |
| 6,801,679 B2 | 10/2004 | Koh et al. | |
| 6,804,463 B1 | 10/2004 | Arecco et al. | |
| 6,810,214 B2 | 10/2004 | Chbat et al. | |
| 6,819,875 B2 * | 11/2004 | Touma | 398/177 |
| 6,826,368 B1 | 11/2004 | Koren et al. | |
| 6,847,743 B2 * | 1/2005 | Yamaguchi | 385/11 |
| 6,850,515 B2 * | 2/2005 | Chang et al. | 370/352 |
| 6,868,232 B2 * | 3/2005 | Park et al. | 398/5 |
| 6,871,021 B2 | 3/2005 | Graves et al. | |
| 6,898,376 B1 * | 5/2005 | Gerstel et al. | 398/5 |
| 6,917,759 B2 * | 7/2005 | de Boer et al. | 398/5 |
| 6,920,287 B1 | 7/2005 | Hinds et al. | |
| 6,933,852 B2 | 8/2005 | Kitajima et al. | |
| 6,934,469 B2 * | 8/2005 | Feinberg et al. | 398/5 |
| 6,934,472 B2 | 8/2005 | Chang et al. | |
| 6,947,623 B2 * | 9/2005 | Ramaswami et al. | 385/16 |
| 6,950,215 B2 * | 9/2005 | Fant et al. | 359/16 |
| 6,957,018 B2 | 10/2005 | Araki et al. | |
| 6,959,126 B1 | 10/2005 | Lofland et al. | |
| 6,965,735 B2 | 11/2005 | Wu et al. | |
| 6,973,228 B2 | 12/2005 | Chang et al. | |
| 6,973,269 B1 | 12/2005 | Britz et al. | |
| 6,980,711 B2 * | 12/2005 | Feinberg et al. | 385/16 |
| 6,980,736 B1 | 12/2005 | Fee et al. | |
| 6,983,108 B2 * | 1/2006 | Sugawara et al. | 398/45 |
| 6,983,109 B1 | 1/2006 | Britz et al. | |
| 6,987,899 B2 | 1/2006 | Fukashiro et al. | |
| 6,999,677 B2 | 2/2006 | Graves et al. | |
| 7,035,537 B2 | 4/2006 | Wang et al. | |
| 7,039,316 B2 | 5/2006 | Chang et al. | |
| 7,039,318 B2 | 5/2006 | Graves | |
| 7,042,559 B1 | 5/2006 | Frigo et al. | |
| 7,046,928 B1 | 5/2006 | Bradford et al. | |
| 7,065,268 B2 | 6/2006 | Prairie et al. | |
| 7,076,163 B2 | 7/2006 | Kinoshita et al. | |
| 7,079,715 B2 | 7/2006 | Kish et al. | |
| 7,099,578 B1 * | 8/2006 | Gerstel | 398/5 |
| 7,099,582 B2 | 8/2006 | Belhadj-Yahya et al. | |
| 7,113,698 B1 * | 9/2006 | Ryhorchuk et al. | 398/10 |
| 7,120,356 B2 | 10/2006 | Graves et al. | |
| 7,126,908 B1 * | 10/2006 | Lu et al. | 370/228 |
| 7,146,103 B2 | 12/2006 | Yee et al. | |
| 7,151,893 B2 | 12/2006 | Hayashi et al. | |
| 7,155,127 B2 | 12/2006 | Akimoto et al. | |
| 7,161,898 B1 * | 1/2007 | Mazzurco et al. | 370/217 |
| 7,174,066 B1 | 2/2007 | Look | |
| 7,174,096 B2 * | 2/2007 | Berthold et al. | 398/5 |
| 7,181,137 B1 * | 2/2007 | Tamburello et al. | 398/20 |
| 7,197,241 B2 * | 3/2007 | Weston-Dawkes et al. | 398/5 |
| 7,206,508 B2 | 4/2007 | Sharma et al. | |
| 7,212,739 B2 | 5/2007 | Graves et al | |
| 7,224,706 B2 | 5/2007 | Loeffler-Lejeune | |
| 7,239,773 B2 | 7/2007 | Sakai et al. | |
| 7,242,860 B2 * | 7/2007 | Ikeda et al. | 398/5 |
| 7,242,861 B2 | 7/2007 | Sato et al. | |
| 7,266,297 B2 | 9/2007 | Schafer et al. | |
| 7,283,740 B2 * | 10/2007 | Kinoshita et al. | 398/5 |
| 7,283,748 B2 * | 10/2007 | Jung et al. | 398/72 |
| 7,317,875 B2 | 1/2008 | Moriwaki et al. | |
| 7,326,916 B2 | 2/2008 | Sugiyama et al. | |
| 7,372,804 B2 | 5/2008 | Arikawa et al. | |
| 7,376,348 B2 | 5/2008 | Hasuo et al. | |
| 7,389,018 B1 | 6/2008 | Birk et al. | |
| 7,394,983 B2 | 7/2008 | Lee et al. | |
| 7,398,018 B2 | 7/2008 | Ohara | |
| 7,426,347 B2 | 9/2008 | Hnatiw et al. | |
| 7,433,362 B2 | 10/2008 | Mallya et al. | |
| 7,474,851 B2 | 1/2009 | Inman et al. | |
| 7,526,200 B2 | 4/2009 | Nakano et al. | |
| 7,533,254 B2 | 5/2009 | Dybsetter et al. | |
| 7,664,397 B2 | 2/2010 | Yuki et al. | |
| 2001/0046074 A1 * | 11/2001 | Kakizaki et al. | 359/110 |
| 2002/0015200 A1 | 2/2002 | Jennings et al. | |
| 2002/0015209 A1 | 2/2002 | Suzuki | |
| 2002/0018265 A1 | 2/2002 | Graves | |
| 2002/0018616 A1 * | 2/2002 | Li | 385/24 |
| 2002/0021472 A1 | 2/2002 | Nakaishi | |
| 2002/0021659 A1 * | 2/2002 | Meijen et al. | 370/217 |
| 2002/0027689 A1 | 3/2002 | Bartur et al. | |
| 2002/0041409 A1 | 4/2002 | Laham et al. | |
| 2002/0044315 A1 * | 4/2002 | Sugawara et al. | 359/110 |
| 2002/0080438 A1 | 6/2002 | Beine et al. | |
| 2002/0080440 A1 * | 6/2002 | Li et al. | 359/110 |
| 2002/0093712 A1 | 7/2002 | Fukashiro et al. | |
| 2002/0097682 A1 | 7/2002 | Enam et al. | |
| 2002/0109879 A1 | 8/2002 | Wing So | |
| 2002/0109882 A1 | 8/2002 | Araki et al. | |
| 2002/0118410 A1 * | 8/2002 | Manganini et al. | 359/110 |
| 2002/0126342 A1 | 9/2002 | Wetzel et al. | |
| 2002/0131120 A1 | 9/2002 | Araki et al. | |
| 2002/0163683 A1 | 11/2002 | Antoniades et al. | |
| 2003/0123876 A1 | 7/2003 | Almstrom et al. | |
| 2003/0152390 A1 | 8/2003 | Stewart et al. | |
| 2003/0174659 A1 | 9/2003 | Handelman | |
| 2003/0180047 A1 * | 9/2003 | Way et al. | 398/59 |
| 2004/0008989 A1 | 1/2004 | Hung | |
| 2004/0017967 A1 | 1/2004 | Tajima | |
| 2004/0028056 A1 | 2/2004 | Mitchem et al. | |

| | | |
|---|---|---|
| 2004/0042796 A1 | 3/2004 | Con-Carolis et al. |
| 2004/0052524 A1 | 3/2004 | Arnold |
| 2004/0105136 A1* | 6/2004 | Feinberg ................... 359/20 |
| 2004/0114925 A1* | 6/2004 | Berthold et al. ............... 398/45 |
| 2004/0141741 A1* | 7/2004 | Palacharla et al. ............. 398/5 |
| 2004/0153566 A1 | 8/2004 | Lalsangi et al. |
| 2004/0190905 A1 | 9/2004 | Kano |
| 2004/0208506 A1* | 10/2004 | Kinoshita et al. ............. 398/19 |
| 2004/0208510 A1 | 10/2004 | Ohara |
| 2004/0208574 A1 | 10/2004 | Kinoshita et al. |
| 2004/0208578 A1* | 10/2004 | Kinoshita et al. ............. 398/83 |
| 2005/0074236 A1 | 4/2005 | Urimindi et al. |
| 2005/0108444 A1 | 5/2005 | Flauaus et al. |
| 2005/0135810 A1* | 6/2005 | Kim et al. ..................... 398/72 |
| 2005/0163503 A1 | 7/2005 | Lee et al. |
| 2005/0180316 A1* | 8/2005 | Chan ......................... 370/216 |
| 2005/0196165 A1 | 9/2005 | Dybsetter et al. |
| 2006/0013584 A1 | 1/2006 | Miyazaki |
| 2006/0013585 A1 | 1/2006 | Hnatiw et al. |
| 2006/0045520 A1 | 3/2006 | Nakano et al. |
| 2006/0056843 A1 | 3/2006 | Fee et al. |
| 2006/0269282 A1 | 11/2006 | Gerstel |
| 2007/0147835 A1 | 6/2007 | Kim et al. |
| 2007/0230954 A1 | 10/2007 | Sakai et al. |
| 2007/0237521 A1 | 10/2007 | Meyer et al. |
| 2008/0050117 A1 | 2/2008 | Koley |
| 2009/0034963 A1* | 2/2009 | Look ............................ 398/5 |
| 2009/0034965 A1 | 2/2009 | Look |
| 2009/0080881 A1 | 3/2009 | Yokoyama |

OTHER PUBLICATIONS

Office Action dated Jun. 10, 2009 for U.S. Appl. No. 10/785,617, filed Feb. 23, 2004, 11 pages.
International Search Report and Written Opinion mailed Dec. 8, 2008 for related matter PCT/US08/78025 filed Sep. 26, 2008, 12 pages.
Office Action dated Jan. 29, 2009 for U.S. Appl. No. 10/785,617, filed Feb. 23, 2004, 13 pages.
Office Action dated Mar. 20, 2008 for U.S. Appl. No. 10/785,617, filed Feb. 23, 2004, 13 pages.
Office Action dated Sep. 20, 2007 for U.S. Appl. No. 10/785,617, filed Feb. 23, 2004, 20 pages.
Office Action dated Jan. 23, 2007 for U.S. Appl. No. 10/785,617, filed Feb. 23, 2004, 13 pages.
Office Action dated Dec. 30, 2009 for U.S. Appl. No. 10/785,617, filed Feb. 23, 2004, 19 pgs.
Office Action dated Jun. 1, 2010 for U.S. Appl. No. 10/785,617, filed Feb. 23, 2004, 10 pgs.
Module from Academic Press Dictionary of Science and Technology, (1992), retrieved from http://www.credoreference.com/entry/apdst/module on Dec. 21, 2009, 1 pg.

* cited by examiner

METHOD AND AN APPARATUS TO PROVIDE OPTICAL EQUIPMENT PROTECTION

FIELD OF INVENTION

The present invention relates to optical network systems, and more particularly, to providing optical equipment protection in an optical network system.

BACKGROUND

In a contemporary optical network system, a number of optical network nodes may be coupled to each other via optical fibers. Optical signals are transmitted across the optical fibers from one optical network node to another. The optical network nodes may be located in different geographical sites. All physical modules that comprise the node have a non-zero failure rate. In the event of a module failure, modules in it usually takes a significant amount of time for a technician to travel to a particular site to replace a failed or degraded optical network node. During this time, information cannot pass and the network is said to be "unavailable" for flows that are disrupted.

To improve the availability of the optical network nodes and to reduce potential down time due to equipment failure in an optical network system, some existing optical network nodes include one or more protection modules as a back up for one or more working modules. Optical switches gating an incoming optical signal to different parts of the optical network node is used in some optical network nodes to switch from a failed module to the protection module when an error signal is detected. However, the system may not know whether the protection module is operational until the switch passes the optical signal to the protection module when the working module fails. Therefore, a hidden failure problem with the protection module may exist without being detected until the protection module is used. Such a hidden failure problem may cause unexpected delay in the recovery of the optical network system.

Alternatively, some existing optical network nodes include optical splitters to split optical signals entering different parts of the optical network nodes. But such a hardware configuration typically adopts a fairly complex rerouting strategy to allow for the case in which only some of the parts of the optical network nodes fail and the optical network nodes are not entirely replaced with protection equipment.

SUMMARY

The present invention includes a method to provide optical equipment protection. In one embodiment, the method includes splitting an incoming optical signal into a first and a second optical signals, sending the first and the second optical signals to a first and a second optical equipments in an optical network node, respectively, the second equipment being a protection module for the first equipment, monitoring a first and a second outgoing optical signals from the first and second equipments, and declaring a failure of the optical network node if one of the first and the second outgoing optical signals has failed.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method to provide optical equipment protection in optical network systems is described. In the following description, numerous specific details are set forth. However, it is understood that embodiments of the invention may be practiced without these specific details. In other instances, well-known components, structures, and techniques have not been shown in detail in order not to obscure the understanding of this description.

Some portions of the following detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
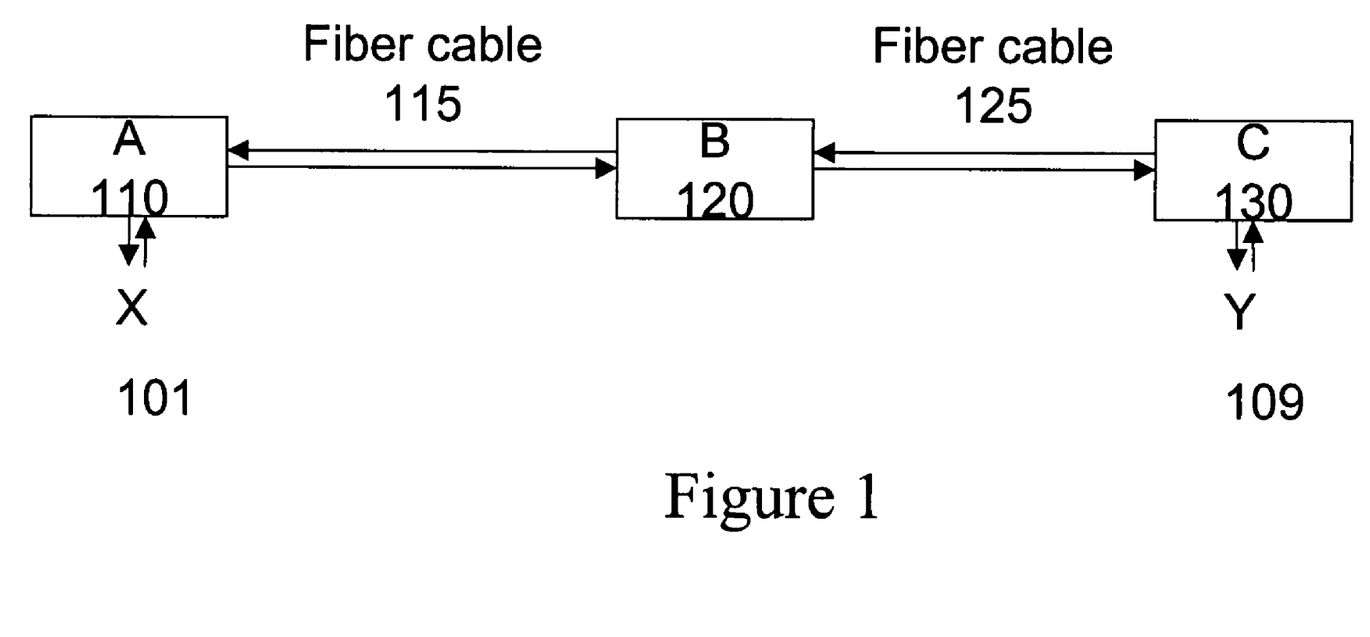
FIG. 1 illustrates an exemplary embodiment of an optical network system.

FIG. 1 illustrates an exemplary embodiment of an optical network system. The optical network system 100 includes three optical network nodes 110, 120, and 130, and two sets of optical fiber cables 115 and 125. The optical network nodes 110 and 120 are coupled to each other via the optical fiber cables 115. Likewise, the optical network nodes 120 and 130 are coupled to each other via the optical fiber cables 125. Optical signals travel between point X 101 and point Y 109 via the optical network nodes 110, 120, and 130.

In general, the traffic of optical signals in the optical network system 100 may be interrupted by two types of failures. The first type of failure occurs in either set of the optical fiber cables 115 or 125. The second type of failure occurs in one or more of the optical network nodes 110, 120, and 130. The second type of failure is also referred to as optical equipment failure. Various embodiments of a method and an apparatus to protect against optical equipment failure are discussed below.

Figure 2A:
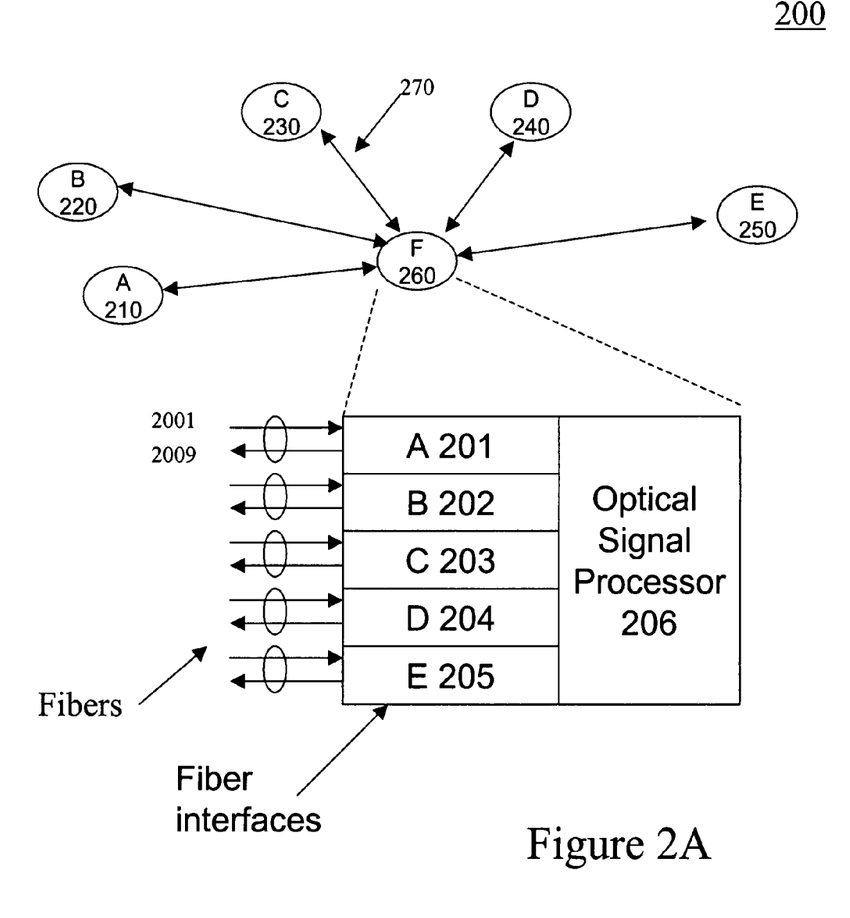
FIG. 2A illustrates one embodiment of an optical network system comprising an optical cross-connect.

FIG. 2A illustrates one embodiment of an optical network system comprising an optical cross-connect (OXC). The OXC is connected to other optical network nodes A-F (210-260). The optical network nodes A-F (210-260) are coupled to each other via optical fiber cables 270. To illustrate the concept, the optical network node 260 is illustrated in detail in FIG. 2A. The optical network node 260 includes fiber interfaces 201-205, each of which corresponds to one of the optical network nodes coupled to the optical network node 260. For instance, the fiber interface 201 is coupled to the optical network node 210. It should be apparent that the optical network node may include a different number of fiber interfaces, depending on the number of optical network nodes that are coupled to this optical network node in the optical network system. Each of the fiber interfaces 201-205 may include amplifiers, multiplexers, and de-multiplexers to amplify the incoming or outgoing optical signals, to demultiplex the incoming optical signal by wavelength, and to de-multiplex the outgoing optical signal.

The optical network node 260 further includes an optical signal processor 206. In one embodiment, the optical signal processor 206 includes wavelength switch modules. The optical signal processor 206 processes incoming optical signals and switches each of the incoming optical signals to one of the fiber interfaces 201-205 to be output to another optical network node or to be dropped to an optical-electrical conversion domain. For example, the input optical signal 2001 from the optical network node 210 enters the optical network node 260 via the fiber interface 201. The optical signal processor 206 may process the signal 2001 and directs the processed signal to the fiber interface 201 to output the processed signal as the optical signal 2009.

One should appreciate that although FIG. 2A shows a particular direction on a particular optical fiber, optical signal traffic may go in both directions on all optical fibers.

Note that any or all of the components of the system in FIG. 2A and associated hardware may be used in various embodiments of the present invention. However, it can be appreciated that other configurations of the networked data storage system may include some or all of the devices disclosed above.

Figure 2B:
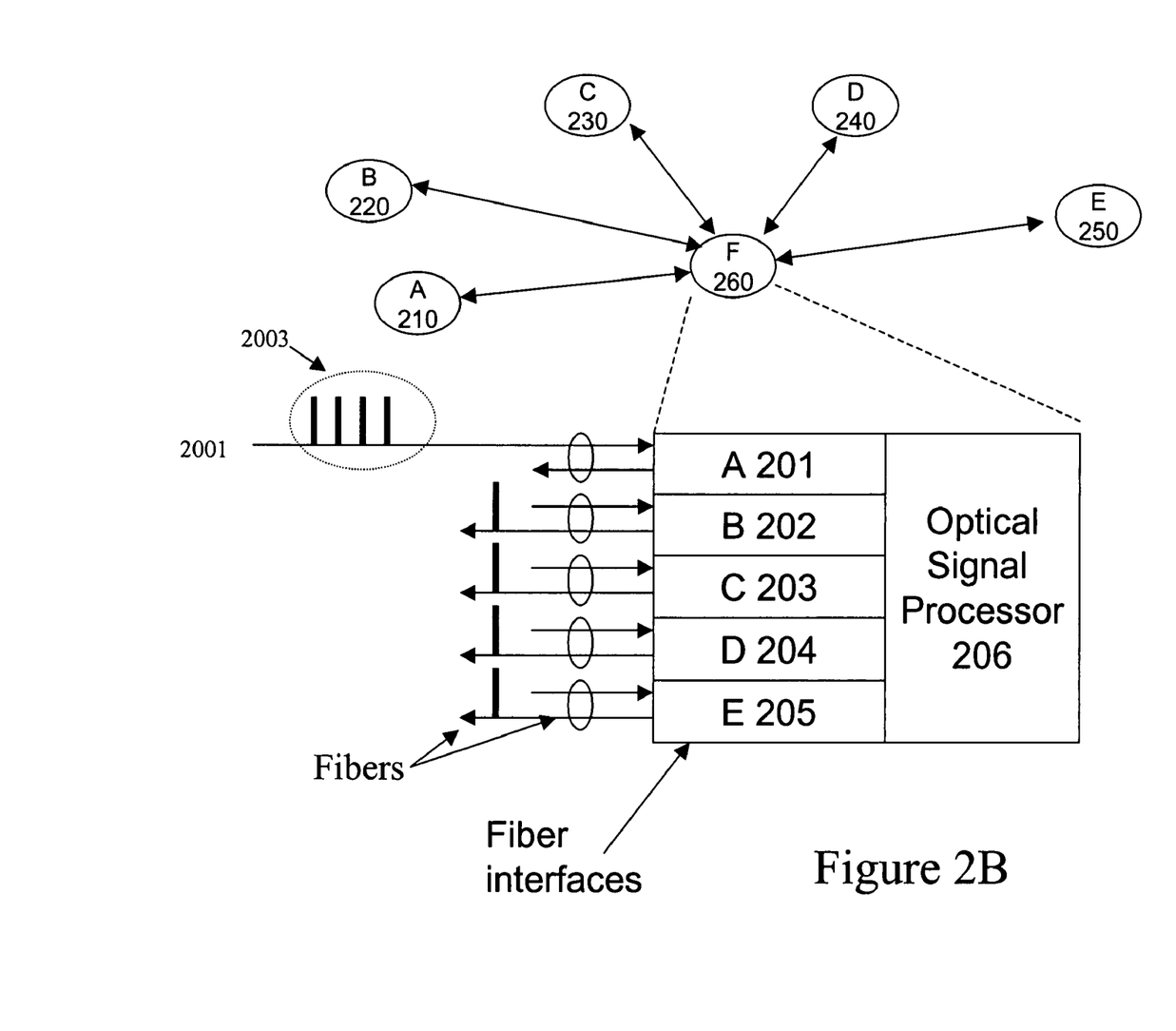
FIG. 2B illustrates an example of wavelength switching in the exemplary optical cross-connect 200.

FIG. 2B illustrates an example of wavelength switching in the exemplary optical cross-connect 200. In one embodiment, the incoming optical signal 2001 carried by a single fiber cable includes multiple optical signals carried in different wavelengths. For instance, the optical signal 2001 is shown to include optical signals carried in four different wavelengths 2003. The optical signal processor 206 may demultiplex the optical signal 2001 by wavelength into four optical signals, each carried by a distinct wavelength. Then the optical signal processor 206 may forward each of the demultiplexed signals to one of the fiber interfaces 202-205 to be output via the corresponding fiber interfaces 202-205. Therefore, if something is wrong with the fiber interface 201, the optical signals flowing out from the other fiber interfaces 202-205 are affected.

Figure 2C:
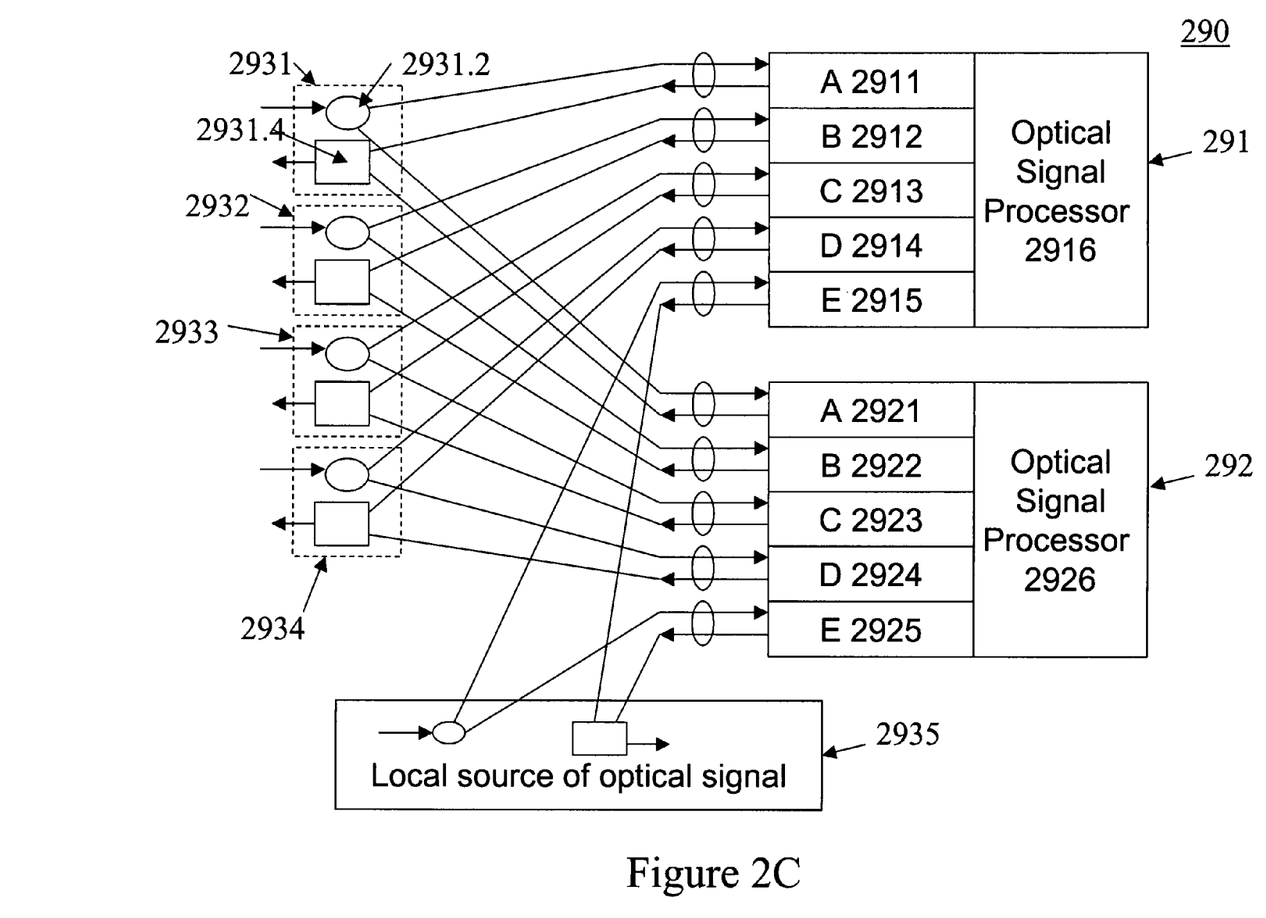
FIG. 2C illustrates one embodiment of an optical network system providing optical equipment protection.

FIG. 2C illustrates one embodiment of an optical network system providing optical equipment protection. The system 290 may include an OXC, such as the OXC 200 in FIGS. 2A and 2B. Referring to FIG. 2C, the system 290 includes two optical equipments 291 and 292 and a number of protection modules 2931-2935. The optical equipments 291 and 292, as well as the protection modules 2931-2935, may be part of an OXC. One should appreciate that additional components, such as additional optical network nodes, that may be included in the system 290 are not shown in FIG. 2C to avoid obscuring the view.

The optical equipments 291 and 292 are substantially identical to each other such that each of the optical equipments 291 and 292 can be viewed as a protection equipment or backup equipment for the other. In one embodiment, the optical equipments 291 and 292 are within a single optical network node. Each of the optical equipments 291 and 292 includes a number of fiber interfaces 2911-2915 or 2921-2925 and an optical signal processor 2916 or 2926.

The optical network system 290 further includes a number of protection modules 2931-2935, each of which is coupled to a corresponding fiber interface of each of the optical equipments 291 and 292. For instance, the protection module 2931 is coupled to the fiber interface 2911 of the optical equipment 291 and the fiber interface 2921 of the optical equipment 292. Some of the protection modules couple the optical equipments 291 and 292 to another optical network node, while the remaining protection modules couple the optical equipments 291 and 292 to a local source of optical signals, such as an optical-electrical conversion domain of the optical network node. For example, referring to FIG. 2C, the protection modules 2931-2934 are coupled to other optical network nodes and the protection module 2935 is coupled to the local source of optical signals.

Each of the protection modules 2931-2935 includes an optical splitter (e.g., 2931.2) and an optical switch (e.g., 2931.4). The optical splitter splits an incoming optical signal into two optical signals. In one embodiment, the two split optical signals are substantially identical. One of the split optical signals is input to the optical equipment 291 and the other to the optical equipment 292 so that both optical equipments 291 and 292 receive live optical signals from the splitters of the protection modules 2931-2935.

Likewise, the optical switch receives two optical signals, one from each of the optical equipments 291 and 292, and outputs one of these two optical signals. For example, the switch 2931.4 in the protection module 2931 receives an optical signal from the fiber interface 2911 and another optical signal from the fiber interface 2921. The switch 2931.4 outputs one of these two optical signals. Therefore, the switches can be used to bypass one of the optical equipments 291 and 292. Furthermore, in one embodiment, the signal output by the switch in the protection module 2935 is converted into one or more electrical signals. The conversion of the optical signal into electrical signal may also be referred to as terminating the optical signal.

Each of the protection modules 2931-2934 couples both the optical equipments 291 and 292 to another optical network node (e.g., optical network nodes 210-250 in FIG. 2B) in the optical network system 290. When either one of the optical equipment 291 or 292 fails, the optical switches in the protection modules 2931-2935 change state to bypass the failed optical equipment entirely, regardless of which part within the optical equipment fails. In one embodiment, the switches switch substantially simultaneously when one of the switches receives a good signal and a failed signal from the optical equipments 291 and 292. More detail of one embodiment of a process to provide optical equipment protection is discussed below with reference to FIG. 3.

Figure 3:
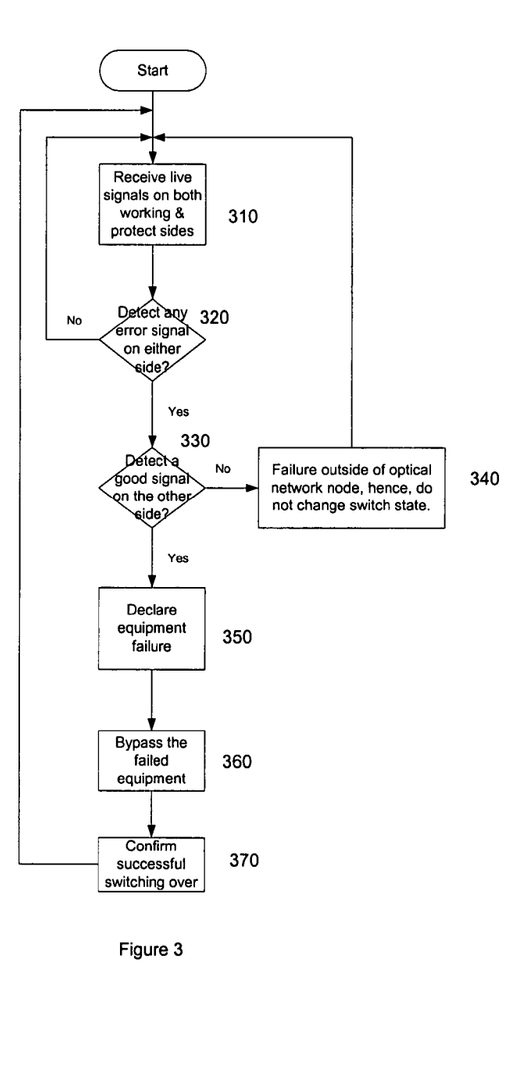
FIG. 3 illustrates a flow diagram of one embodiment of a process to provide optical equipment protection.

FIG. 3 illustrates a flow diagram of one embodiment of a process to provide optical equipment protection in an optical network system. The process is performed by processing logic that may comprise hardware (e.g., circuitry, dedicated logic, etc.), software (such as is run on a general-purpose computer system or a dedicated machine), or a combination of both.

Processing logic receives live optical signals on both working and protection sides of an optical network node (processing block 310). Then processing logic determines whether any error signal is detected on either side (processing block 320). If no error signal is detected on either side, processing logic returns to processing block 310 to continue receiving live signals.

If an error signal is detected on either side, then processing logic determines whether a good signal is detected on the other side (processing block 330). If processing logic does not detect any good signal on the other side, then processing logic determines that the failure is outside of the optical network node as neither the working nor the protection side functions properly, and hence, processing logic does not change the states of the switches coupled to the output ports of the working and protection modules (processing block 340).

Otherwise, processing logic declares an optical equipment failure (processing block 350). Processing logic may send an alarm to prompt a technician to replace the failed side. Then processing logic causes the switches to bypass the failed equipment by switching to the side outputting the good signal (processing block 360). After bypassing the failed equipment, processing logic confirms the switching has been successful (processing block 370). Then processing logic may return to the processing block 310 to repeat the process. In the mean time, the optical network node may continue to transmit optical signals with the remaining operational equipment.

The foregoing discussion merely describes some exemplary embodiments of the present invention. One skilled in the art will readily recognize from such discussion, the accompanying drawings and the claims that various modifications can be made without departing from the spirit and scope of the invention.

The invention claimed is:

1. A method comprising:
   splitting an incoming optical signal into a first and a second optical signals;
   sending the first and the second optical signals to a first and a second equipments in an optical network node, respectively, the second equipment being a protection module for the first equipment;
   monitoring a first and a second outgoing optical signals from the first and second equipments;
   using a switch to select only one of the first and the second outgoing optical signals from the optical network node;
   outputting the only one of the first and the second outgoing optical signals selected;
   declaring a failure of the optical network node if only one of the first and the second outgoing optical signals has failed; and
   if both of the first and the second outgoing optical signals have failed,
      determining a failure is outside of the optical network node, and
      maintaining a signal selection state of the switch to continue outputting the only one of the first and the second outgoing optical signals in the same direction without declaring that the optical network node has failed.

2. The method of claim 1, further comprising:
   bypassing the first optical equipment if the first optical signal has failed and the second optical signal has not failed; and
   bypassing the second optical equipment if the second optical signal has failed and the first optical signal has not failed.

3. The method of claim 2, further comprising sending an alarm if either the first or the second optical signal has failed.

4. The method of claim 1, further comprising declaring a failure has occurred outside of the optical network node if both the first and second optical signals have failed.

5. The method of claim 1, further comprising amplifying the first and the second optical signals at the first and second equipments, respectively.

6. The method of claim 1, wherein each of the first and second equipments comprises a wavelength switch module.

7. The method of claim 6, wherein each of the first and second equipments further comprises a multiplexer and a de-multiplexer.

8. The method of claim 7, wherein each of the first and second equipments further comprises a plurality of amplifiers.

9. A non-transitory tangible machine-accessible medium that stores instructions which, if executed by a processor, will cause the processor to perform operations comprising:
   splitting an incoming optical signal into a first and a second optical signals;
   sending the first and the second optical signals to a first and a second equipments in an optical network node, respectively, the second equipment being a protection module for the first equipment;
   monitoring a first and a second outgoing optical signals from the first and second equipment; and
   using a switch to select only one of the first and the second outgoing optical signals from the optical network node;
   outputting the only one of the first and the second outgoing optical signals selected;
   declaring a failure of the optical network node if only one of the first and the second outgoing optical signals has failed; and if both of the first and the second outgoing optical signals have failed, determining a failure is outside of the optical network node, and maintaining a signal selection state of the switch to continue outputting the only one of the first and the second outgoing optical signals in the same direction without declaring that the optical network node has failed.

10. The non-transitory tangible machine-accessible medium of claim 9, wherein the operations further comprise:
bypassing the first equipment if the first optical signal has failed and the second optical signal has not failed; and
bypassing the second equipment if the second optical signal has failed and the first optical signal has not failed.

11. The non-transitory tangible machine-accessible medium of claim 10, wherein the operations further comprise sending an alarm if either the first or the second optical signal has failed.

12. The non-transitory tangible machine-accessible medium of claim 9, wherein the operations further comprise declaring a failure has occurred outside of the optical network node if both the first and second optical signals have failed.

13. An apparatus comprising:
a first optical equipment in an optical network device having a first plurality of input ports and a first plurality of output ports;
a second optical equipment in the optical network device having a second plurality of input ports and a second plurality of output ports, the second optical equipment being a protection module of the first optical equipment;
a plurality of optical signal splitters, each of the plurality of optical signal splitters coupled to one of the first plurality of input ports and one of the second plurality of input ports, to split an incoming optical signal into a first and a second optical signals and to input to the first and the second optical equipments, respectively; and
a plurality of optical signal switches, each of the plurality of the optical signal switches coupled to one of the first plurality of output ports and one of the second plurality of output ports, to select a first output optical signal from the first optical equipment, wherein a respective optical signal switch switches to select a second output optical signal from the second optical equipment if the first output optical signal fails and the second output optical signal has not failed, and if both of the first and the second outgoing optical signals have failed, to determine a failure is outside of the optical network node, and a signal selection state of the respective optical signal switch remains unchanged to continue selecting the first output optical signal to output in the same direction without declaring that the optical network device has failed, wherein the plurality of optical signal switches are switched together substantially simultaneously.

14. The apparatus of claim 13, wherein the optical signal switch selects the second output optical signal from the second optical equipment if the first output optical signal from the first optical equipment fails and the second output optical signal from the second optical equipment has not failed.

15. The apparatus of claim 13, wherein the optical signal switch selects the first output optical signal from the first optical equipment if the second output optical signal from the second optical equipment fails and the first output optical signal from the first optical equipment has not failed.

16. The apparatus of claim 13, wherein each of the first and the second optical equipment includes a wavelength switch module.

17. The apparatus of claim 16, wherein each of the first and the second optical equipment further includes a multiplexer and a demultiplexer.

18. The apparatus of claim 17, wherein each of the first and the second optical equipment further includes a plurality of amplifiers.

19. A system comprising:
a plurality of optical fibers; and
a plurality of optical nodes coupled to each other via the plurality of optical fibers, each of the plurality of optical nodes comprising:
a first optical equipment in an optical network device having a first plurality of input ports and a first plurality of output ports;
a second optical equipment in the optical network device having a second plurality of input ports and a second plurality of output ports, the second optical equipment being a protection module of the first optical equipment;
a plurality of optical signal splitters, each of the plurality of optical signal splitters coupled to one of the first plurality of input ports and one of the second plurality of input ports, to split an incoming optical signal into a first and a second optical signals and to input to the first and the second optical equipment, respectively; and
a plurality of optical signal switches, each of the plurality of the optical signal switches coupled to one of the first plurality of output ports and one of the second plurality of output ports, to select a first output optical signal from the first optical equipment, wherein a respective optical signal switch switches to select a second output optical signal from the second optical equipment if the first output optical signal fails and the second output optical signal has not failed, and if both of the first and the second outgoing optical signals have failed, to determine a failure is outside of the optical network node, and a signal selection state of the respective optical signal switch remains unchanged to continue selecting the first output optical signal to output in the same direction without declaring that the optical network device has failed, wherein the plurality of optical signal switches are switched together substantially simultaneously.

20. The system of claim 19, wherein the optical signal switch selects the second output optical signal from the second optical equipment if the first output optical signal from the first optical equipment fails and the second output optical signal from the second optical equipment has not failed.

21. The system of claim 19, wherein the optical signal switch selects the first output optical signal from the first optical equipment if the second output optical signal from the second optical equipment fails and the first output optical signal from the first optical equipment has not failed.

22. The system of claim 19, wherein each of the first and the second optical equipment includes a wavelength switch module.

23. The system of claim 22, wherein each of the first and the second optical equipment includes a multiplexer and a demultiplexer.

24. The system of claim 23, wherein each of the first and the second optical equipment includes a plurality of amplifiers.

* * * * *